US012588587B2

(12) United States Patent
Swartz et al.

(10) Patent No.: US 12,588,587 B2
(45) Date of Patent: Mar. 31, 2026

(54) ROTATABLE RING CONTROL MECHANISM AND METHOD FOR CONTROL ARM OF WHEELED LAWN CARE MACHINE

(71) Applicant: Kubota Corporation, Osaka (JP)

(72) Inventors: Douglas Swartz, Gainesville, GA (US); Min Sung Kim, Gainesville, GA (US); Michael Phan, Gainesville, GA (US)

(73) Assignee: Kubota Corporation, Osaka (JP)

( * ) Notice: Subject to any disclaimer, the term of this patent is extended or adjusted under 35 U.S.C. 154(b) by 631 days.

(21) Appl. No.: 18/147,962

(22) Filed: Dec. 29, 2022

(65) Prior Publication Data

US 2024/0215480 A1     Jul. 4, 2024

(51) Int. Cl.
   *A01D 34/68*       (2006.01)
   *A01D 34/82*       (2006.01)
   *A01D 101/00*     (2006.01)

(52) U.S. Cl.
   CPC ........... *A01D 34/68* (2013.01); *A01D 34/824* (2013.01); *A01D 2034/6843* (2013.01); *A01D 2101/00* (2013.01)

(58) Field of Classification Search
   CPC .................. A01D 34/68; A01D 34/824; A01D 2034/6843; A01D 2101/00
   See application file for complete search history.

(56) References Cited

U.S. PATENT DOCUMENTS 1,716,141 A * 6/1929 Knight ...................... F16C 1/16
                                    74/489
7,430,847 B2 * 10/2008 Hoffman ................ A01D 69/03
                                    56/10.8

8,333,258 B2 * 12/2012 Wismann ............... B62K 23/04
                                    180/335
9,963,065 B2    5/2018 Otto et al.
10,589,670 B2    3/2020 Dwyer
2015/0135891 A1 * 5/2015 Bochereau ............. B62K 21/12
                                    74/551.9
2022/0204070 A1 * 6/2022 Yu .......................... A01D 34/00
2022/0232762 A1 * 7/2022 Peters .................. B62D 11/183
2024/0081178 A1 * 3/2024 Wang ..................... A01D 34/74
2025/0065951 A1 * 2/2025 Albinger .................. B62D 1/12

FOREIGN PATENT DOCUMENTS

WO       2021090050 A1    5/2021

OTHER PUBLICATIONS

Kubota Zero Turn Mower Operator's Manual Model ZD326-EU-2, Kubota Manufacturing of Americal Corporation, Gainesville, GA, Apr. 20, 2016, 109 pages.

* cited by examiner

*Primary Examiner* — Joseph M Rocca
*Assistant Examiner* — Jose Antonio Martinez
(74) *Attorney, Agent, or Firm* — Hovey Williams LLP; Kameron D. Kelly

(57)            ABSTRACT

A rotatable ring control mechanism is mounted on a control arm of a riding mower and allows a user to control a function of the riding mower. The mechanism includes an inner support component and an outer interface ring. The inner component secures the mechanism to the control arm and includes a signal generating technology receiving a control input and generating a corresponding control signal. The outer ring rotates around the inner component and around a longitudinal axis of the control arm to provide the control input to the signal generating technology.

17 Claims, 4 Drawing Sheets

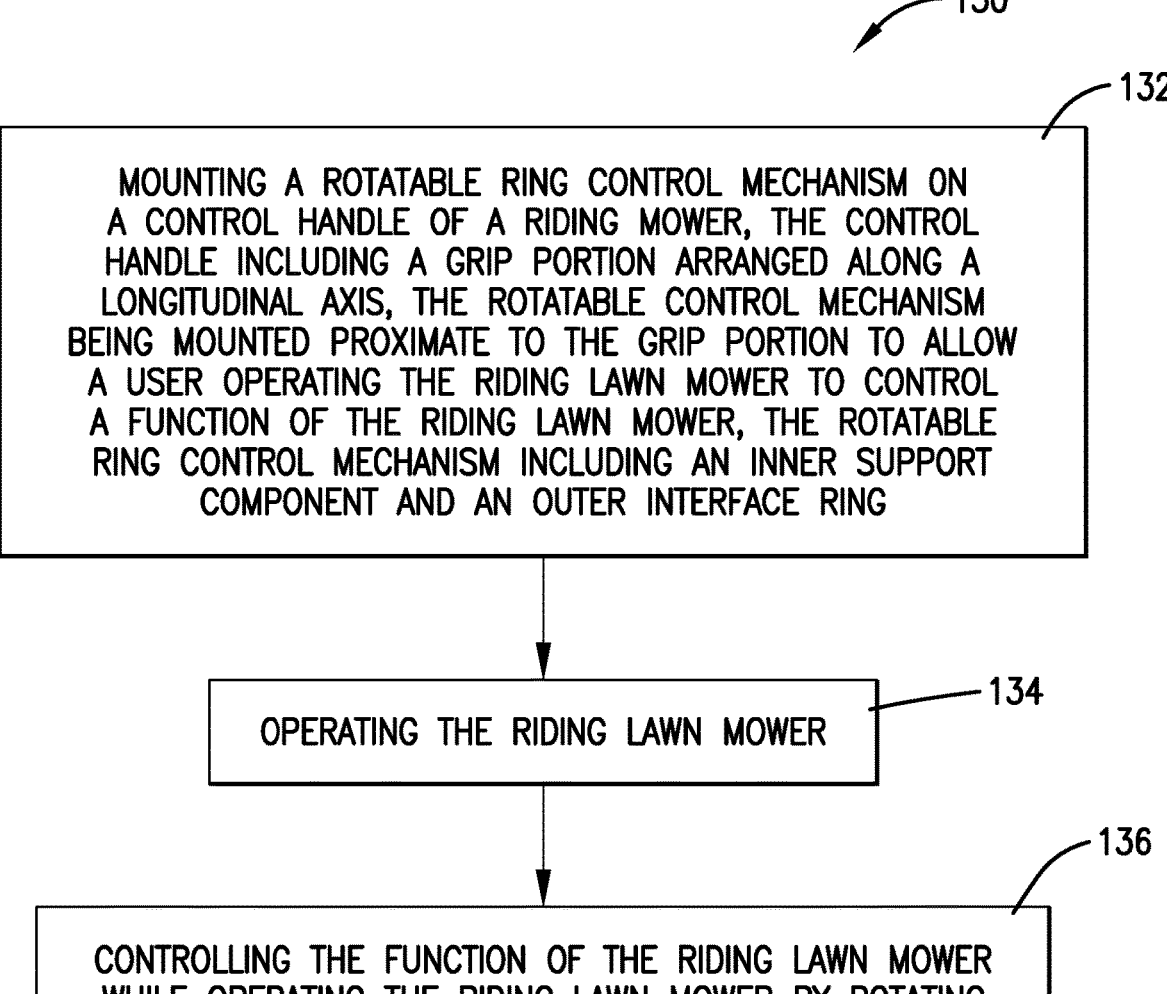

MOUNTING A ROTATABLE RING CONTROL MECHANISM ON A CONTROL HANDLE OF A RIDING MOWER, THE CONTROL HANDLE INCLUDING A GRIP PORTION ARRANGED ALONG A LONGITUDINAL AXIS, THE ROTATABLE CONTROL MECHANISM BEING MOUNTED PROXIMATE TO THE GRIP PORTION TO ALLOW A USER OPERATING THE RIDING LAWN MOWER TO CONTROL A FUNCTION OF THE RIDING LAWN MOWER, THE ROTATABLE RING CONTROL MECHANISM INCLUDING AN INNER SUPPORT COMPONENT AND AN OUTER INTERFACE RING

OPERATING THE RIDING LAWN MOWER

CONTROLLING THE FUNCTION OF THE RIDING LAWN MOWER WHILE OPERATING THE RIDING LAWN MOWER BY ROTATING THE OUTER INTERFACE RING TO PROVIDE THE CONTROL INPUT TO THE SIGNAL GENERATING TECHNOLOGY

*Fig. 7*

ROTATABLE RING CONTROL MECHANISM AND METHOD FOR CONTROL ARM OF WHEELED LAWN CARE MACHINE

FIELD

The present invention relates to control technologies for wheeled lawn care machines, and more particularly, embodiments concern a rotatable ring control mechanism and method for controlling a function of a wheeled lawn care machine, wherein the mechanism is mounted on a control arm of the lawn care machine and is rotatably actuatable to control the function.

BACKGROUND

Control mechanisms are provided on riding mowers, including "zero-turn" riding mowers, to allow users to control various functions of the mowers while in operation. Current control mechanism technologies include, for example, buttons, switches, push-pull knobs, and levers, mounted at various locations on the riding mower, including on control boxes coupled with control handles. Such control mechanisms suffer from several problems and limitations, including that they are large and obtrusive, have an unappealing aesthetic, are overly complicated due to the number of buttons and switches, and are prone to accidental engagement.

This background discussion is intended to provide information related to the present invention which is not necessarily prior art.

SUMMARY

Embodiments address the above-described and other problems and limitations in the prior art by providing a rotatable ring control mechanism and method for controlling a function of a wheeled lawn care machine, wherein the mechanism is mounted on a control arm of the lawn care machine and is rotatably actuatable to control the function. For example, embodiments of the ring control mechanism are mounted on the control handle and are rotated during operation and so advantageously allow the user to maintain their grip on the control handle while using the rotatable ring control mechanism. Further, the rotatable ring control mechanism is advantageously more convenient, aesthetically appealing, and safer to operate than prior art control mechanisms.

In an embodiment of the present invention, a wheeled lawn care machine may be provided for moving over the ground. The wheeled lawn care machine may include a drive apparatus, a control handle, and a rotatable ring control mechanism. The drive apparatus may be configured to propel the lawn care machine over the ground. The control handle may be configured to be gripped by a user and to facilitate directing the lawn care machine. The control handle may include a grip portion arranged along a longitudinal axis. The rotatable ring control mechanism may be mounted on the control handle proximate to the grip portion and configured to allow a user operating the lawn care machine to control the lawn care machine. The rotatable ring control mechanism may include an inner support component and an outer interface ring. The inner support component may secure the ring control mechanism to the control handle and may include a signal generating technology receiving a control input and generating a corresponding control signal to control the wheeled lawn care machine. The outer interface ring may rotate around the inner support component and around the longitudinal axis of the control handle to provide the control input to the signal generating technology.

In various implementations, the above-described embodiment may include any one or more of the following additional or alternative features. The wheeled lawn care machine may be a riding lawn mower or a zero-turn riding lawn mower. The signal generating technology may include a cable and the corresponding control signal may involve mechanical movement of the cable. The signal generating technology may be a potentiometer and the corresponding control signal may involve an electronic signal. The outer interface ring may include an outer periphery which is a same height as a surface of the control handle so as to present a minimal profile relative to the control handle. The outer interface ring may rotate smoothly and continuously between a first position and a second position, or the outer interface ring may rotate between multiple discrete positions. The outer interface ring may produce a feedback when rotated.

The rotatable ring control mechanism may control a function such as starting and stopping the drive apparatus, increasing and decreasing the speed of the drive apparatus, turning on and off a component of the wheeled lawn care machine, adjusting a height of a lower deck, starting or stopping one or more deck motors driving one or more cutting blades of the lower deck, increasing and decreasing the speed of one or more deck motors driving one or more cutting blades of the lower deck, applying and releasing a brake, engaging and disengaging a power take-off, and opening and closing a discharge chute. The control handle may include first and second control arms, with a first rotatable ring control mechanism mounted on the first control arm and a second rotatable ring control mechanism mounted on the second control arm. There may be a plurality of the control mechanisms mounted on the control handle and arranged in series about the longitudinal axis. The rotatable ring control mechanism may control a single function, with the single function being selectable by the user from among a plurality of different functions.

In another embodiment of the present invention, a control method may be provided for controlling a function of a riding lawn mower. The control may include the following steps. A riding lawn mower having a pair of steering control arms may be operated, wherein at least one of the steering control arms comprises a grip portion and a rotatable ring control mechanism mounted proximate to the grip portion. A function of the riding lawn mower may be controlled while operating the riding lawn mower by rotating an outer interface ring of the rotatable ring control mechanism to provide a control input to a signal generating technology of the ring control mechanism.

In various implementations, the above-described embodiment may include any one or more of the following additional or alternative features. The outer interface ring may include an outer periphery which is substantially the same height as an outer surface of the control handle so as to present a minimal profile relative to the control handle. The outer interface ring may rotate smoothly and continuously between a first position and a second position, or the outer interface ring may rotate between multiple discrete positions. The rotatable ring control mechanism may control a function such as starting and stopping the drive apparatus, increasing and decreasing the speed of the drive apparatus, turning on and off a component of the riding lawn mower, adjusting a height of a lower deck, starting or stopping one or more deck motors driving one or more cutting blades of the lower deck, increasing and decreasing the speed of one or more deck motors driving one or more cutting blades of the lower deck, applying and releasing a brake, engaging and disengaging a power take-off, and opening and closing a discharge chute.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein:

FIG. 7 is a flowchart of steps involved in an anti-scalp method which may be employed with the example wheeled lawn care machine shown in FIG. 1.

Figure 1:
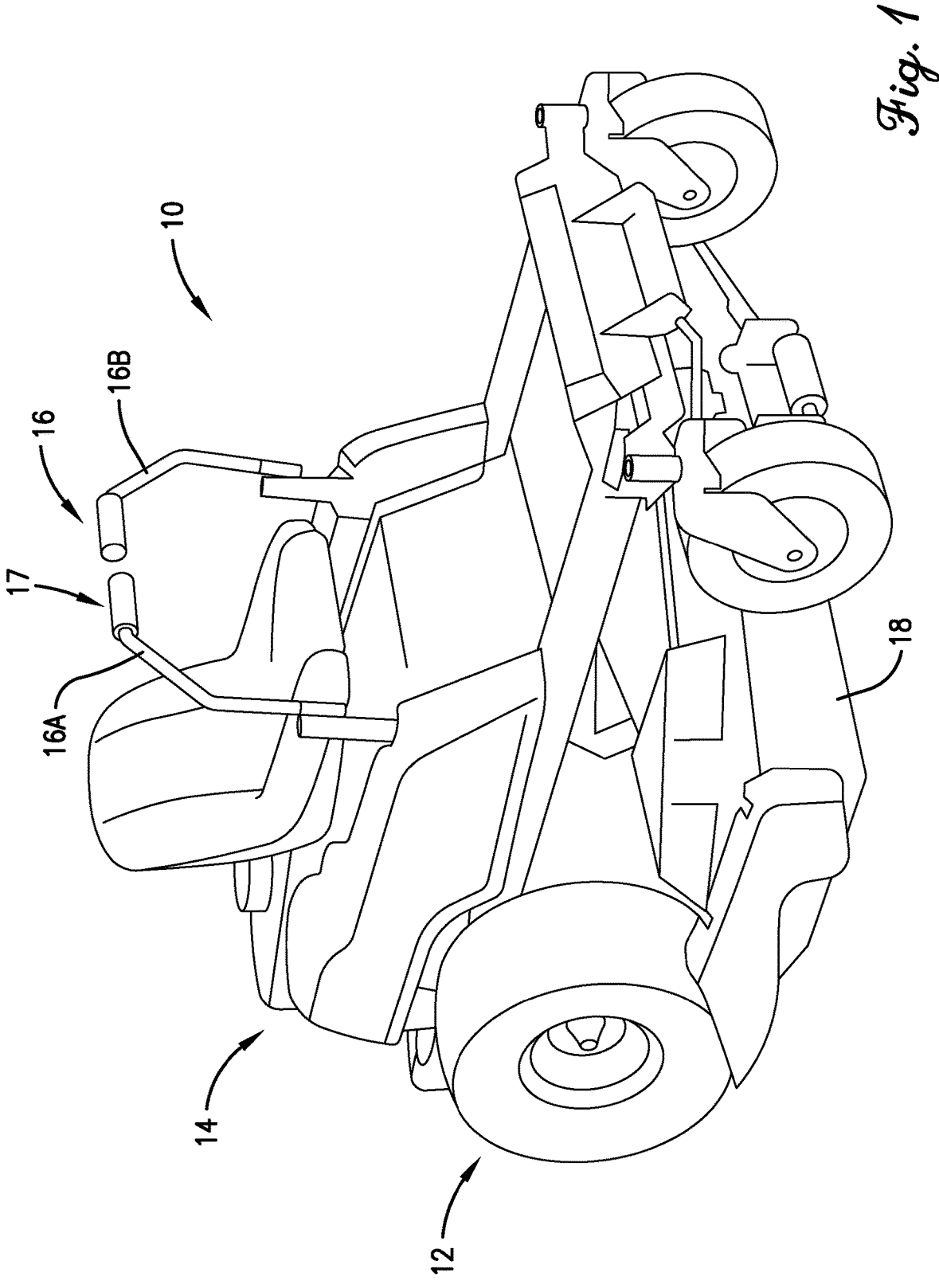
FIG. 1 is a plan view of an example wheeled lawn care machine in the form of a riding mower having a lower deck.
Figures 2, 3:
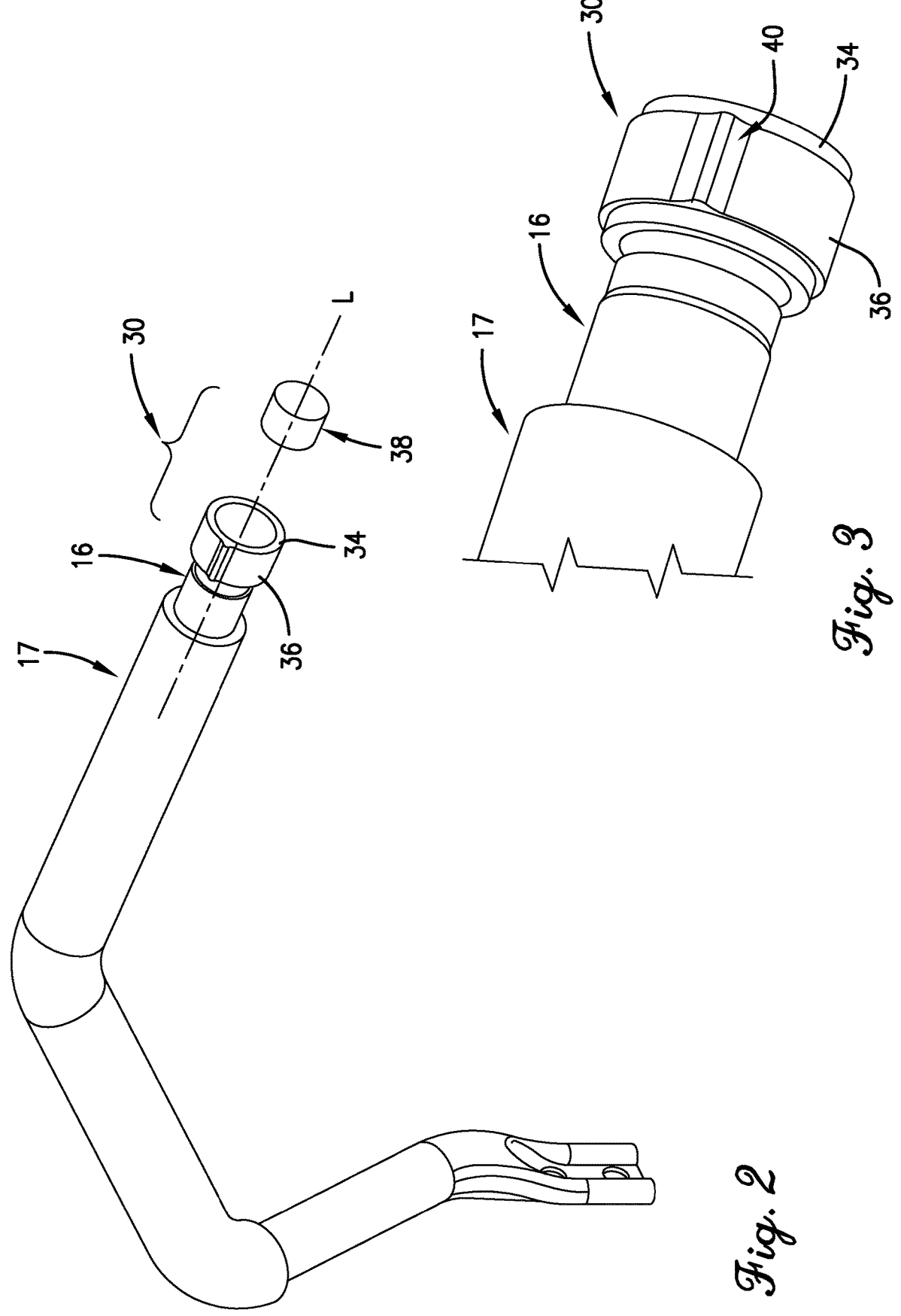
FIG. 2 is an exploded isometric view of an embodiment of a rotatable ring control mechanism for controlling a function of the wheeled lawn care machine of FIG. 1, wherein the mechanism is mounted on a control arm of the lawn care machine and is rotatably actuatable to control the function.
FIG. 3 is a fragmentary perspective view of the rotatable ring control mechanism of FIG. 2.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment", "an embodiment", or "embodiments" mean that the feature or features referred to are included in at least one embodiment of the invention. Separate references to "one embodiment", "an embodiment", or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly, embodiments provide a rotatable ring control mechanism and method for controlling a function of a wheeled lawn care machine, such as a riding lawn mower, wherein the mechanism is mounted on a control arm of the lawn care machine and is rotatably actuatable to control the function. Embodiments of the ring control mechanism are mounted on the control handle and are rotated during operation and so advantageously allow the user to maintain their grip on the control handle while using the rotatable ring control mechanism. Further, the rotatable ring control mechanism is advantageously more convenient, aesthetically appealing, and safer to operate than prior art control mechanisms.

Referring to FIGS. 1-6, an embodiment of an example wheeled lawn care machine 10 for performing tasks related to lawn care (e.g., cutting or mulching) may include a plurality of wheels 12, a drive apparatus 14, a control handle 16, a lower deck 18, and a rotatable ring control mechanism 30. The plurality of wheels 12 may be substantially any suitable number, design, and configured of wheels for accomplishing the task(s) of the lawn care machine 10. In various implementations, there may be three or four wheels, and the rear wheel(s) may be larger than the front wheel(s).

The drive apparatus 14 may be a combustion engine or one or more electric motors suitable for propelling the lawn care machine 10 over the ground and for otherwise accomplishing the task(s) of the lawn care machine 10. In one implementation, the drive apparatus 14 may also drive (e.g., via belts) one or more rotating cutting blades (not shown) located within a volume defined by the lower deck 18. In another implementation, the cutting blades of the lower deck 18 may be directly or indirectly driven by one or more electric motors (not shown) supported on the lower deck 18. When the cutting blades are powered by deck electric motors, the drive apparatus 14 propelling the lawn care machine may 10 also be one or more drive electric motors, thereby providing an all-electric lawn care machine 10. One embodiment of an all-electric lawn care machine 10 employs two drive motors (one for each rear wheel) and multiple deck motors (one for each cutting blade), wherein all the motors are powered by a common rechargeable battery (not shown).

The control handle 16 may be configured to facilitate a user controlling a direction of travel of the lawn care machine 10. In various implementations, the control handle 16 may take the form of separate lever arms, as may be used in a riding lawn care machine, or a single joined handle, as may be used in a walk-behind lawn care machine. The control handle 16 may include a grip portion 17 having a generally cylindrical shape and arranged along a longitudinal axis L. The lower deck 18 may be located below the drive apparatus 14 and configured to be normally positioned a particular distance, or within a particular range of distances, above generally flat ground during performance of the lawn care task(s). For example, the lower deck 18 may be positionable between one inch and six inches above the ground.

In one implementation of the first embodiment, the wheeled lawn care machine may be a riding lawn mower, such as a zero-turn lawn mower, having two rear wheels, two front wheels, a combustion engine or electric motor driving a cutting blade, left and right steering control levers, and a lower deck partially surrounding the cutting blade and normally positioned between one and four inches above the ground. In an alternative implementation, the wheeled lawn care machine may be configured to be towed behind another vehicle, such as a lawn tractor. In this embodiment the towing vehicle may provide the control handle and the engine or motor, and power from the engine or motor may be delivered to the lawn care machine via a power takeoff connection to accomplish the lawn care task(s).

The rotatable ring control mechanism 30 may be mounted on the control handle 16 proximate to the grip portion 17 to allow a user operating the wheeled lawn care machine 10 to provide an input to control a component, function, or process of the lawn care machine 10 by rotatably actuating the rotatable ring control mechanism 30. The rotatable ring control mechanism 30 may be located at or near the end of the control handle 16. An embodiment of the rotatable ring control mechanism 30 may comprise an inner support component 34 and an outer interface ring 36.

The inner support component 34 may be configured to secure the rotatable ring control mechanism 30 to the control handle 16, and may include a signal generating technology 38. The inner support component 34 may be secured using substantially any suitable securement technology, such as a press fit, a set screw, and/or an internal expansion locking mechanism. The signal generating technology 38 may be substantially any technology suitable for transmitting the user's input via the rotatable ring control mechanism 30 to another component of the lawn care machine 10 (e.g., a carburetor, a drive motor controller, a deck motor controller, a transmission, a deck height adjustor), for action in response to the input. In various implementations, the signal generating technology 38 may be mechanical, such as a physical cable extending between the rotatable ring control mechanism 30 and the other component, or electronic, such as a wire carrying an electrical signal between the rotatable ring control mechanism 30 and the other component. For example, the signal generating technology 38 may be a potentiometer, and the user's input may result in the potentiometer increasing or decreasing an electrical resistance and thereby affecting an electrical signal to the other component of the lawn care machine 10.

The outer interface ring 36 may be configured to be rotatable by the user around the inner support component 34 and around the longitudinal axis L of the control handle 16 to provide the input for transmission by the signal generating technology 38. In the example, in which the signal generating technology 38 of the inner support component 34 is a potentiometer, the user's rotation of the outer interface component 36 may rotate a shaft of the potentiometer.

The outer interface ring 36 may have an outer periphery which is substantially the same height as the surface of the grip portion 17 of the control handle 16, including any covering thereon, so as to present a minimal profile relative to the control handle 16. The outer interface ring 36 may rotate smoothly and continuously between a start, minimum, or other first position and a stop, maximum, or second position, or the outer interface ring 36 may rotate between multiple discrete positions which are tactilely distinguishable by mechanical stops.

By rotating the outer interface ring, 36 the user may provide input to control such operations, processes, or other functions as starting and stopping the engine or main drive motor(s) 14; increasing and decreasing the speed of the engine or drive motor(s) 14 starting or stopping one or more deck motors driving one or more cutting blades of the lower deck; increasing and decreasing the speed of one or more deck motors driving one or more cutting blades of the lower deck; turning on and off a component of the lawn care machine 10; adjusting the height of the lower deck 18;

applying and releasing a brake; engaging and disengaging a power take-off; and/or opening and closing an operator-controlled discharge chute.

Figure 4:
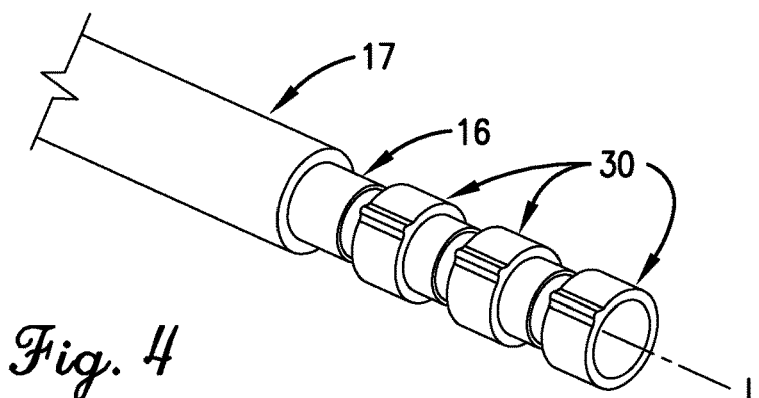
FIG. 4 is a fragmentary isometric view of a first implementation of the rotatable ring control mechanism, wherein multiple instances of the rotatable ring control mechanism are shown arranged in series.
Figure 5:
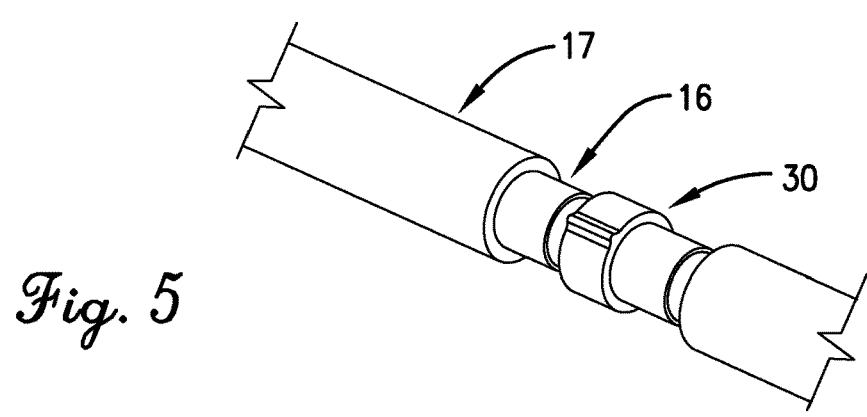
FIG. 5 is a fragmentary isometric view of a second implementation of the rotatable ring control mechanism, wherein the rotatable ring control mechanism is shown mounted on a one-piece handle.

In one implementation, the outer interface ring 36 may produce an audible (e.g., "click") and/or visual (e.g., flash) feedback when rotated. In one implementation, the outer interface ring 36 may include a projection 40, shown in FIG. 3, extending radially outward relative to the longitudinal axis of the control handle 16 and configured to be physically engaged and acted upon by the user's thumb or other finger to facilitate rotating the outer interface ring 36. In one implementation, the control handle 16 may include first and second control arms 16A, 16B, and a first rotatable ring control mechanism 30 may be mounted on the first control arm 16A and a second rotatable ring control mechanism 30 may be mounted on the second control arm 16B. Additionally or alternatively, as shown in FIG. 4, a plurality of the rotatable ring control mechanisms 30 may be mounted on the control handle 16, or on one or both of the control arms 16A,16B, and arranged in series about the longitudinal axis.

Figure 6:
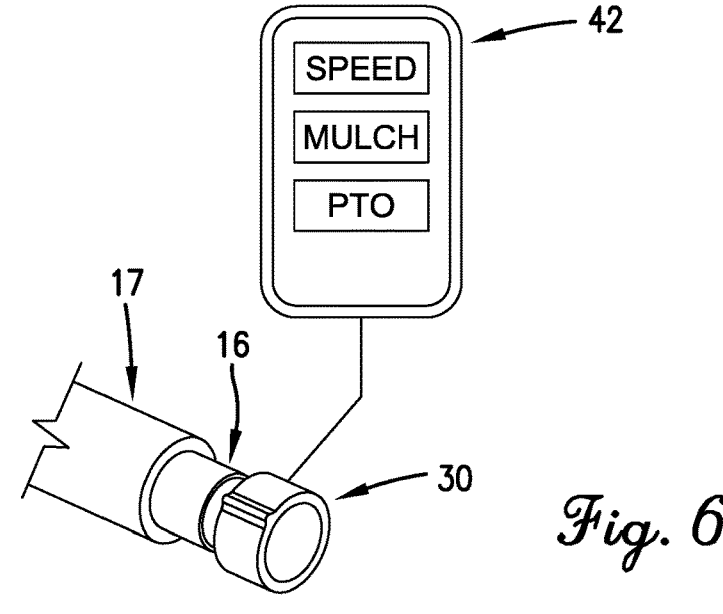
FIG. 6 is a fragmentary isometric view of a third implementation of the rotatable ring control mechanism, wherein the rotatable ring control mechanism is shown in communication with an electronic device allowing for selecting the controlled function.

Referring particularly to FIG. 6, in one implementation, the rotatable ring control mechanism 30 may control one function at a time, but the function may be selectable by the user from among a plurality of different functions displayed on screen of a device 42 and using a touchscreen or another rotatable ring control mechanism to scroll and select.

Referring also to FIG. 7, an embodiment of a rotatable ring control method 130 may be employed for controlling a function of the example wheeled lawn care machine 10 described above. In one implementation, the method 130 may be implemented using the elements of the rotatable ring control mechanism 30 described above. Broadly, the method 130 may include the following steps.

A rotatable ring control mechanism may be mounted on a control handle of the riding lawn mower, the control handle including a grip portion arranged along a longitudinal axis, the rotatable ring control mechanism being mounted proximate to the grip portion to allow a user operating the riding lawn mower to control the riding lawn mower, as shown in 130. The rotatable ring control mechanism may include an inner support component securing the ring control mechanism to the control handle and may including a signal generating technology receiving a control input and generating a corresponding control signal to control the riding lawn mower, and an outer interface ring rotating around the inner support component and around the longitudinal axis of the control handle to provide the control input to the signal generating technology, the outer interface ring including an outer periphery which is a same height as a surface of the control handle so as to present a minimal profile relative to the control handle. In various implementations, the outer interface ring may rotate smoothly and continuously between a first position and a second position, or the outer interface ring may rotate between multiple discrete positions. The outer interface ring may produce a feedback when rotated.

The riding lawn mower may be operated normally, as shown in 132. A function of the riding lawn mower may be controlled while operating the riding lawn mower by rotating the outer interface ring to provide the control input to the signal generating technology for controlling the function, as shown in 134. The function may substantially any normal function, such as starting and stopping the drive apparatus, increasing and decreasing the speed of the drive apparatus, turning on and off a component of the riding lawn mower, adjusting a height of a lower deck, starting or stopping one or more deck motors driving one or more cutting blades of the lower deck, increasing and decreasing the speed of one or more deck motors driving one or more cutting blades of the lower deck, applying and releasing a brake, engaging and disengaging a power take-off, and opening and closing a discharge chute.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A wheeled lawn care machine for moving over a ground, the wheeled lawn care machine comprising:
   a drive apparatus for propelling the wheeled lawn care machine over the ground;
   a control handle configured to be gripped by a user and to facilitate directing the wheeled lawn care machine, the control handle including a grip portion arranged along a longitudinal axis; and
   a rotatable ring control mechanism mounted on the control handle proximate to the grip portion to allow a user operating the wheeled lawn care machine to control a function of the wheeled lawn care machine, the rotatable ring control mechanism including—
      an inner support component securing the rotatable ring control mechanism to the control handle and including a signal generating technology receiving a control input and generating a corresponding control signal to control the function, and
      an outer interface ring rotatable around the inner support component and around the longitudinal axis of the control handle to provide the control input to the signal generating technology to control the function,
   the outer interface ring including an outer periphery which is substantially the same height as a surface of the control handle so as to present a minimal profile relative to the control handle, wherein the rotatable ring control mechanism is located at or near the end of the control handle, and
   the function controlled by the rotatable ring control mechanism includes at least one of—
      i. starting and stopping the drive apparatus,
      ii. increasing and decreasing the speed of the drive apparatus,
      iii turning on and off a component of the riding lawn mower
      iv. adjusting a height of a lower deck,
      v. starting or stopping one or more deck motors driving one or more cutting blades of the lower deck,
      vi. increasing and decreasing the speed of one or more deck motors driving one or more cutting blades of the lower deck,
      vii. applying and releasing a brake,
      viii. engaging and disengaging a power take-off, and/or
      ix. opening and closing a discharge chute.

2. The wheeled lawn care machine of claim 1, wherein the wheeled lawn care machine is a riding lawn mower.

3. The wheeled lawn care machine of claim 2, wherein the riding lawn mower is a zero-turn riding lawn mower.

4. The wheeled lawn care machine of claim 1, wherein the signal generating technology includes a cable and the corresponding control signal is a mechanical movement of the cable.

5. The wheeled lawn care machine of claim 1, wherein the signal generating technology is a potentiometer and the corresponding control signal is an electronic signal.

6. The wheeled lawn care machine of claim 1, the outer interface ring rotating smoothly and continuously between a first position and a second position.

7. The wheeled lawn care machine of claim 1, the outer interface ring rotating between multiple discrete positions.

8. The wheeled lawn care machine of claim 1, the outer interface ring producing a feedback when rotated.

9. The wheeled lawn care machine of claim 1, the control handle including first and second control arms, with a first rotatable ring control mechanism mounted on the first control arm and a second rotatable ring control mechanism mounted on the second control arm.

10. The wheeled lawn care machine of claim 1, there being a plurality of the rotatable ring control mechanisms mounted on the control handle and arranged in series about the longitudinal axis.

11. The wheeled lawn care machine of claim 1, the rotatable ring control mechanism controlling a single function, with the single function being selectable by the user from among a plurality of different functions.

12. A zero-turn riding lawn mower for moving over a ground, the zero-turn riding lawn mower comprising:
   a drive apparatus for propelling the zero-turn riding lawn mower over the ground;
   a control handle including first and second control arms configured to be gripped by a user and to facilitate directing the zero-turn riding lawn mower, each of the first and second control arms including a grip portion arranged along a longitudinal axis; and
   a plurality of rotatable ring control mechanisms, with at least one rotatable ring control mechanism mounted around each of the first and second control arms proximate to the grip portion to allow a user operating the zero-turn riding lawn mower to control a function of the zero-turn riding lawn mower, and each of the rotatable ring control mechanisms including—
      an inner support component securing the rotatable ring control mechanism to the control handle and including a signal generating technology receiving a control input and generating a corresponding control signal to control the function, and
      an outer interface ring rotatable around the inner support component and around the longitudinal axis of the control handle to provide the control input to the signal generating technology to control the function,
   the outer interface ring including an outer periphery which is a same height as a surface of the control handle so as to present a minimal profile relative to the control handle,
   the rotatable ring control mechanism controlling a single function of the zero-turn riding lawn mower, with the single function being selectable by the user from among a plurality of different functions.

13. The zero-turn riding lawn mower of claim 12, the rotatable ring control mechanism controlling a function selected from the group consisting of: starting and stopping the drive apparatus, increasing and decreasing the speed of the drive apparatus, turning on and off a component of the zero-turn riding lawn mower, adjusting a height of a lower deck, starting or stopping one or more deck motors driving one or more cutting blades of the lower deck, increasing and decreasing the speed of one or more deck motors driving one or more cutting blades of the lower deck, applying and releasing a brake, engaging and disengaging a power take-off, and opening and closing a discharge chute.

14. A control method for controlling a function of a riding lawn mower, the control method comprising:

operating a riding lawn mower having a pair of steering control arms, wherein at least one of the steering control arms comprises a grip portion and a rotatable ring control mechanism mounted proximate to the grip portion;

while operating the riding lawn mower, steering the riding lawn mower by moving the steering control arms; and while operating the riding lawn mower, controlling a non-steering function of the riding lawn mower by rotating an outer interface ring of the rotatable ring control mechanism to provide a control input to a signal generating technology of the ring control mechanism, wherein the outer interface ring includes an outer periphery which is substantially the same height as a surface of the control handle so as to present a minimal profile relative to the grip portion.

15. The control method of claim 14, the outer interface ring rotating smoothly and continuously between a first position and a second position.

16. The control method of claim 14, the outer interface ring rotating between multiple discrete positions.

17. The control method of claim 14, the rotatable ring control mechanism controlling a function selected from the group consisting of: starting and stopping the drive apparatus, increasing and decreasing the speed of the drive apparatus, turning on and off a component of the riding lawn mower, adjusting a height of a lower deck, starting or stopping one or more deck motors driving one or more cutting blades of the lower deck, increasing and decreasing the speed of one or more deck motors driving one or more cutting blades of the lower deck, applying and releasing a brake, engaging and disengaging a power take-off, and opening and closing a discharge chute.

\* \* \* \* \*